United States Patent
Romo et al.

(10) Patent No.: US 11,499,559 B2
(45) Date of Patent: Nov. 15, 2022

(54) FLUID PUMP AND OUTLET CHECK VALVE ASSEMBLY THEREOF

(71) Applicant: DELPHI TECHNOLOGIES IP LIMITED, St. Michael (BB)

(72) Inventors: Francisco Romo, Chihuahua (MX); Sonia Espinoza, Chihuahua (MX)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 134 days.

(21) Appl. No.: 17/085,318

(22) Filed: Oct. 30, 2020

(65) Prior Publication Data
US 2022/0136511 A1 May 5, 2022

(51) Int. Cl.
*F04D 15/00* (2006.01)
*F04D 29/12* (2006.01)
*F16K 15/02* (2006.01)

(52) U.S. Cl.
CPC ........ *F04D 15/0011* (2013.01); *F04D 29/126* (2013.01); *F16K 15/026* (2013.01); *F05B 2250/323* (2013.01); *F05B 2250/324* (2013.01)

(58) Field of Classification Search
CPC .. F04D 15/0011; F04D 15/0022; F04D 5/002; F16K 15/00; F16K 15/026; F05B 2250/323; F05B 2250/324
See application file for complete search history.

(56) References Cited

U.S. PATENT DOCUMENTS

| | | | |
|---|---|---|---|
| 5,368,273 A * | 11/1994 | Dante | F02C 7/232 60/734 |
| 5,586,858 A | 12/1996 | Tuckey | |
| 6,231,318 B1 | 5/2001 | Cotton et al. | |
| 2003/0034073 A1 | 2/2003 | Roth | |
| 2003/0037822 A1 | 2/2003 | Fischer et al. | |
| 2003/0037823 A1 | 2/2003 | Pickelman | |
| 2003/0084941 A1* | 5/2003 | Fischer | F16K 15/026 137/541 |

(Continued)

FOREIGN PATENT DOCUMENTS

DE 102004048593 A1 2/2006

OTHER PUBLICATIONS

Extended European Search Report from the European Patent Office in application No. EP21204863.1, dated Apr. 5, 2022 (6 pages).

*Primary Examiner* — Topaz L. Elliott
*Assistant Examiner* — Jackson N Gillenwaters
(74) *Attorney, Agent, or Firm* — Joshua M. Haines

(57) ABSTRACT

A fluid pump includes a housing; an inlet passage; an outlet conduit; a pumping element within the housing; and a check valve assembly. The check valve assembly includes a valve stem within the outlet conduit such that a flow path is created radially between the outlet conduit and the valve stem, the valve stem moving along a check valve assembly axis between a closed position and an open position. The flow path includes a first restriction which increases velocity of fluid passing through the flow path; a first expansion, downstream of the first restriction, which decreases velocity of fluid passing through the flow path; a second restriction, downstream of the first expansion, which increases velocity of fluid passing through the flow path; and a second expansion, downstream of the second restriction, which decreases velocity of fluid passing through the flow path.

12 Claims, 7 Drawing Sheets

(56) References Cited

U.S. PATENT DOCUMENTS

| | | | |
|---|---|---|---|
| 2003/0228211 A1* | 12/2003 | Motojima | F04D 29/188 |
| | | | 415/55.1 |
| 2004/0182438 A1* | 9/2004 | Kobes | F16K 15/026 |
| | | | 137/220 |
| 2008/0047531 A1 | 2/2008 | Breuer et al. | |
| 2008/0047621 A1* | 2/2008 | Ittlinger | F16K 15/063 |
| | | | 137/539 |
| 2010/0024891 A1* | 2/2010 | Francini | F16K 15/026 |
| | | | 137/543.17 |
| 2013/0256577 A1* | 10/2013 | Talaski | F16K 15/063 |
| | | | 251/336 |
| 2013/0340861 A1 | 12/2013 | Rajagopalan et al. | |
| 2015/0096637 A1 | 4/2015 | Hampton et al. | |

* cited by examiner

FLUID PUMP AND OUTLET CHECK VALVE ASSEMBLY THEREOF

TECHNICAL FIELD OF INVENTION

The present disclosure relates to a fluid pump; particularly to a fluid pump with an outlet check valve which minimizes backpressure; and more particularly to such a fluid pump which is a fuel pump.

BACKGROUND OF INVENTION

Fluid pumps for pumping fluids, for example liquid fuel, are known in the art. Such fluid pumps often include a check valve assembly in an outlet conduit thereof in order to prevent fuel from backflowing to the fluid pump. Ideally, after the check valve assembly opens during operation of the fluid pump, the check valve assembly would provide no backpressure. However, in reality, the check valve assembly provides backpressure which negatively impacts fluid delivery. One such fluid pump and check valve assembly is shown in U.S. Pat. No. 5,586,858 to Tuckey.

What is needed is a fluid pump which minimizes or eliminates one or more of the shortcomings as set forth above.

SUMMARY OF THE INVENTION

Briefly described, the present disclosure provides a fluid pump which includes a housing; an inlet passage through which fluid enters the housing; an outlet conduit through which fluid leaves the housing; a pumping element within the housing, the pumping element being configured to draw fluid into the inlet passage and pressurize the fluid which is discharged through the outlet conduit; and a check valve assembly, which allows flow through the outlet conduit in a first direction and prevents flow through the outlet conduit in a second direction which is opposite the first direction. The check valve assembly includes the outlet conduit and a valve stem within the outlet conduit such that a flow path is created radially between the outlet conduit and the valve stem, the valve stem moving along a check valve assembly axis between a closed position which prevents fluid flow through the flow path and an open position which permits fluid flow through the flow path. The flow path includes a first restriction which increases velocity of fluid passing through the flow path; a first expansion, downstream of the first restriction, which decreases velocity of fluid passing through the flow path; a second restriction, downstream of the first expansion, which increases velocity of fluid passing through the flow path; and a second expansion, downstream of the second restriction, which decreases velocity of fluid passing through the flow path.

The present disclosure also provides a check valve assembly which allows flow through a conduit in a first direction and prevents flow through the conduit in a second direction which is opposite the first direction. The check valve assembly includes the conduit and a valve stem within the conduit such that a flow path is created radially between the conduit and the valve stem, the valve stem moving along a check valve assembly axis between a closed position which prevents fluid flow through the flow path and an open position which permits fluid flow through the flow path. The flow path includes a first restriction which increases velocity of fluid passing through the flow path; a first expansion, downstream of the first restriction, which decreases velocity of fluid passing through the flow path; a second restriction, downstream of the first expansion, which increases velocity of fluid passing through the flow path; and a second expansion, downstream of the second restriction, which decreases velocity of fluid passing through the flow path.

The fluid pump and check valve assembly as disclosed herein reduces backpressure compared to fluid pumps and check valve assemblies of the prior art.

BRIEF DESCRIPTION OF DRAWINGS

This invention will be further described with reference to the accompanying drawings in which.

DETAILED DESCRIPTION OF INVENTION

Figure 1:
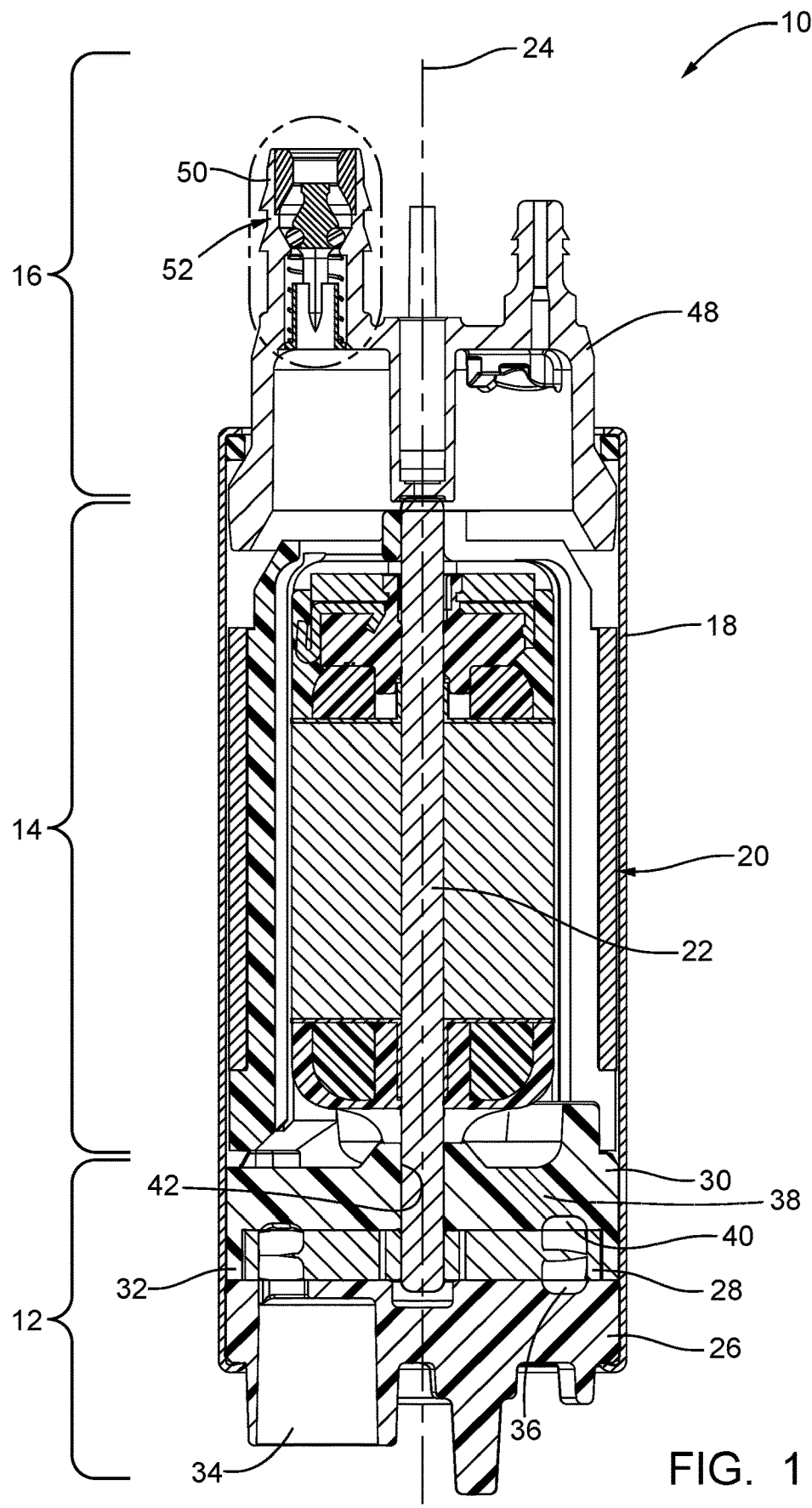
FIG. 1 is an axial cross-sectional view of a fluid pump in accordance with the present disclosure.

Referring initially to FIG. 1, a fluid pump is illustrated, by way of non-limiting example only, as a fuel pump 10. Fuel pump 10 may be, by way of non-limiting example only, submersed in a fuel tank (not shown) which pumps fuel to a fuel consuming device (not shown) such as an internal combustion engine. The fuel pumped by fuel pump 10 may be any liquid fuel customarily used, for example only, gasoline, diesel fuel, alcohol, ethanol, and the like, and blends thereof.

Fuel pump 10 generally includes a pump section 12 at one end, a motor section 14 adjacent to pump section 12, and an outlet section 16 adjacent to motor section 14 at the end of fuel pump 10 opposite pump section 12. A housing 18 of fuel pump 10 is tubular and retains pump section 12, motor section 14 and outlet section 16 together. Fuel enters fuel pump 10 at pump section 12, a portion of which is rotated by motor section 14 as will be described in more detail later, and is pumped past motor section 14 to outlet section 16 where the fuel exits fuel pump 10.

Motor section 14 includes an electric motor 20 which is disposed within housing 18. Electric motor 20 includes a shaft 22 extending therefrom into pump section 12. Shaft 22 rotates about a motor axis 24 when an electric current is applied to electric motor 20. Electric motors and their operation are well known to those of ordinary skill in the art and will not be described in greater detail herein.

Pump section 12 includes an inlet plate 26, a pumping element illustrated as impeller 28, and an outlet plate 30. Inlet plate 26 is disposed at the end of pump section 12 that is distal from motor section 14 while outlet plate 30 is disposed at the end of pump section 12 that is proximal to motor section 14. Both inlet plate 26 and outlet plate 30 are fixed relative to housing 18 to prevent relative movement between inlet plate 26 and outlet plate 30 with respect to housing 18. Outlet plate 30 defines a spacer ring 32 on the side of outlet plate 30 that faces toward inlet plate 26. Impeller 28 is disposed axially between inlet plate 26 and outlet plate 30 such that impeller 28 is radially surrounded by spacer ring 32. Impeller 28 is fixed to shaft 22 such that impeller 28 rotates with shaft 22 in a one-to-one relationship. Spacer ring 32 is dimensioned to be slightly thicker than the dimension of impeller 28 in the direction of motor axis 24, i.e. the dimension of spacer ring 32 in the direction of motor axis 24 is greater than the dimension of impeller 28 in the direction of motor axis 24. In this way, inlet plate 26, outlet plate 30, and spacer ring 32 are fixed within housing 18, for example by crimping the axial ends of housing 18. Axial forces created by the crimping process will be carried by spacer ring 32, thereby preventing impeller 28 from being clamped tightly between inlet plate 26 and outlet plate 30 which would prevent impeller 28 from rotating freely. Spacer ring 32 is also dimensioned to have an inside diameter that is larger than the outside diameter of impeller 28 to allow impeller 28 to rotate freely within spacer ring 32 and axially between inlet plate 26 and outlet plate 30. While the pumping element has been illustrated as impeller 28, it should now be understood that other pumping elements may alternatively be used, by way of non-limiting example only, a gerotor, gears, or roller vanes. Furthermore, while spacer ring 32 is illustrated as being made as a single piece with outlet plate 30, it should be understood that spacer ring 32 may alternatively be made as a separate piece that is captured axially between outlet plate 30 and inlet plate 26.

Inlet plate 26 is generally cylindrical in shape, and includes an inlet passage 34 that extends through inlet plate 26 in the same direction as motor axis 24. Inlet passage 34 is a passage which introduces fuel into fuel pump 10/housing 18. Inlet plate 26 also includes an inlet plate flow channel 36 formed in the face of inlet plate 26 that faces toward impeller 28. Inlet plate flow channel 36 is in fluid communication with inlet passage 34.

Outlet plate 30 is generally cylindrical in shape and includes an outlet plate outlet passage 38 that extends through outlet plate 30 where it should be noted that outlet plate outlet passage 38 is an outlet for pump section 12. Outlet plate outlet passage 38 is in fluid communication with outlet section 16. Outlet plate 30 also includes an outlet plate flow channel 40 formed in the face of outlet plate 30 that faces toward impeller 28. Outlet plate flow channel 40 is in fluid communication with outlet plate outlet passage 38. Outlet plate 30 also includes an outlet plate aperture, hereinafter referred to as lower bearing 42, extending through outlet plate 30. Shaft 22 extends through lower bearing 42 in a close-fitting relationship such that shaft 22 is able to rotate freely within lower bearing 42 and such that radial movement of shaft 22 within lower bearing 42 is limited to the manufacturing tolerances of shaft 22 and lower bearing 42. In this way, lower bearing 42 radially supports a lower end of shaft 22 that is proximal to pump section 12.

Figure 2:
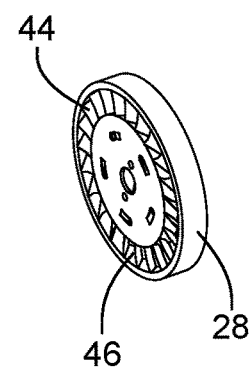
FIG. 2 is an impeller of the fluid pump.
Figure 3:
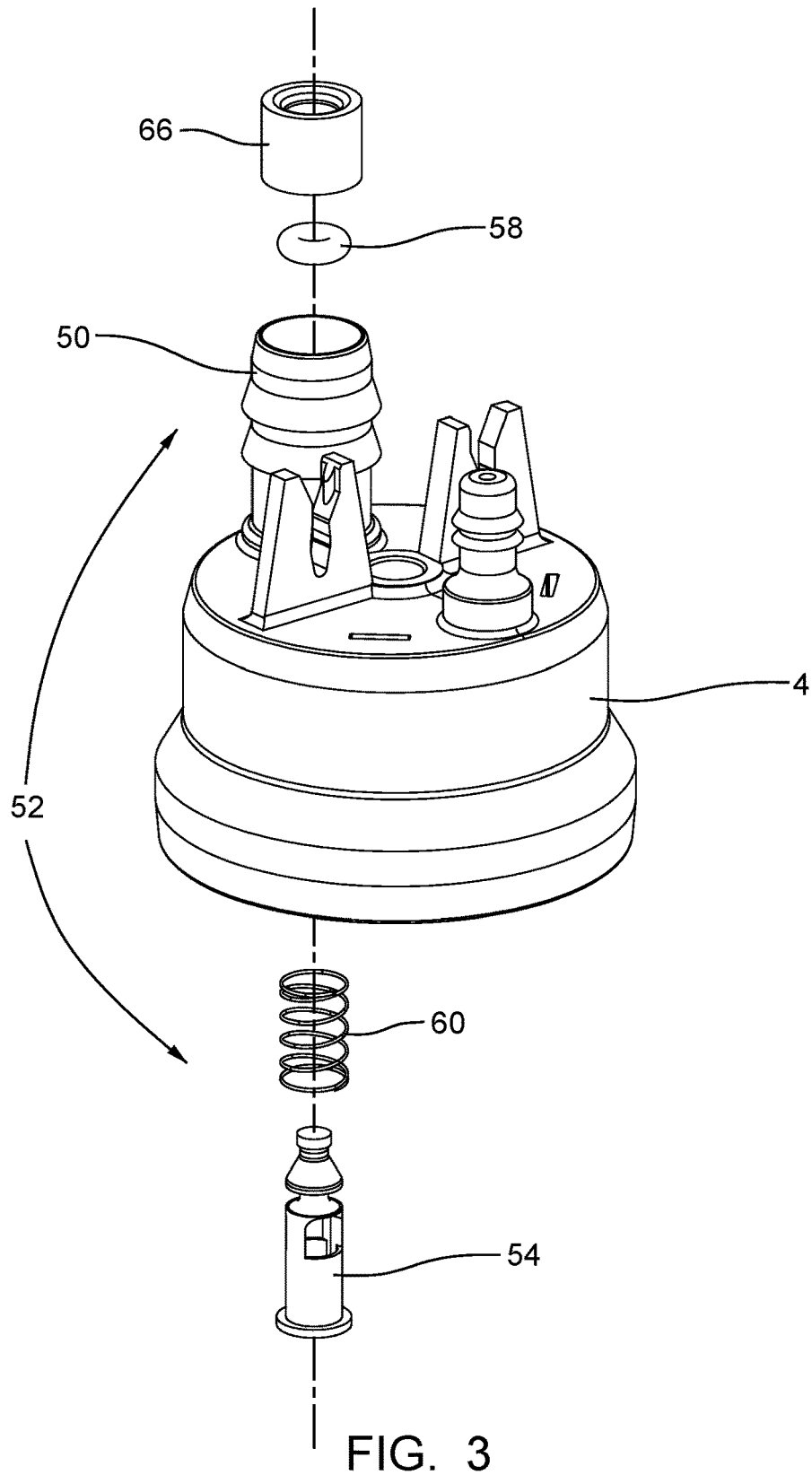
FIG. 3 is an exploded isometric view of an end cap and check valve assembly of the fluid pump.

Impeller 28 includes a plurality of impeller blades 44, as can be most clearly seen in FIG. 2, arranged in a polar array radially surrounding and centered about motor axis 24 such that impeller blades 44 are aligned with inlet plate flow channel 36 and outlet plate flow channel 40. Impeller blades 44 are each separated from each other by an impeller blade chamber 46 that passes through impeller 28 in the general direction of motor axis 24. Impeller 28 may be made, for example only, by a plastic injection molding process in which the preceding features of impeller 28 are integrally molded as a single piece of plastic.

With continued reference to FIG. 1, and now with additional reference to FIGS. 3-7, outlet section 16 includes an end cap 48 which closes the upper end of housing 18. End cap 48 includes an outlet conduit 50 which provides fluid communication out of housing 18 such that outlet conduit 50 is in fluid communication with outlet plate outlet passage 38 of outlet plate 30 for receiving fuel that has been pumped by pump section 12. Rotation of impeller 28 by shaft 22 causes fluid to be pumped from inlet passage 34 to outlet conduit 50 and to be pressurized within housing 18 such that pressurized fuel is communicated out of housing 18. In order to prevent a backflow of fuel into housing 18 through outlet conduit 50, fuel pump 10 also includes a check valve assembly 52. Check valve assembly 52 generally comprises outlet conduit 50, a valve stem 54 which is movable along a check valve assembly axis 56 and includes a sealing member illustrated as O-ring 58, and a valve spring 60. Check valve assembly 52 and its components will be described in greater detail in the paragraphs that follow.

Figure 4:
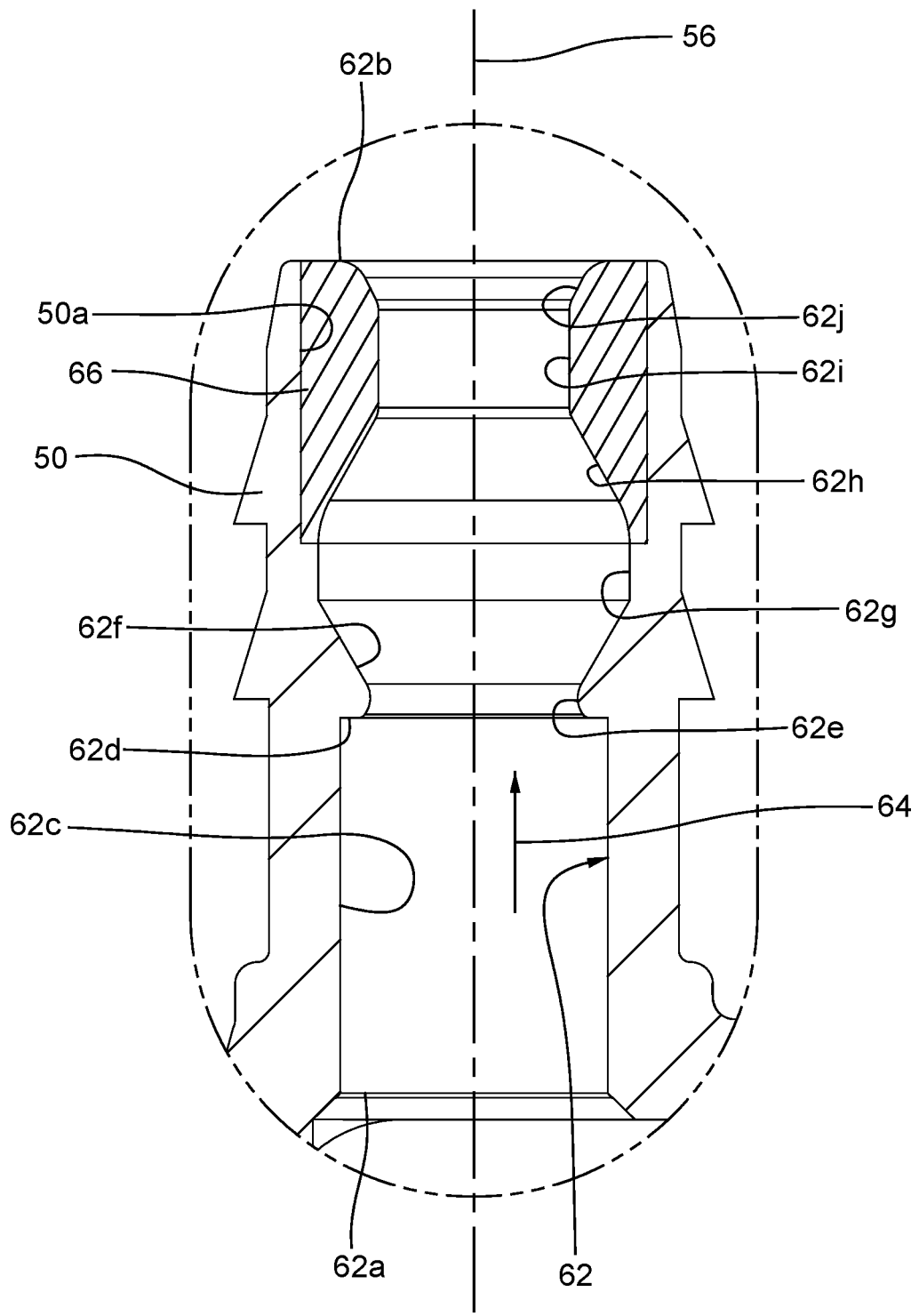
FIG. 4 is an enlarged cross-sectional view of an outlet conduit of the fluid pump.

With particular reference to FIG. 4, outlet conduit 50 includes an inner wall surface 62 which is centered about, and extends along, check valve assembly axis 56 from an upstream end 62a to a downstream end 62b. Starting at upstream end 62a, an inner wall surface initial section 62c extends toward downstream end 62b and preferably has a uniform diameter. Inner wall surface initial section 62c terminates at a shoulder 62d which faces toward upstream end 62a and which is transverse to check valve assembly axis 56, preferably perpendicular to check valve assembly axis 56. Immediately downstream of shoulder 62d is an inner wall surface reduced section 62e which is smaller in diameter than inner wall surface initial section 62c, thereby forming shoulder 62d. Following inner wall surface reduced section 62e is an inner wall surface diverging section 62f which diverges away from check valve assembly axis 56 when moving along check valve assembly axis 56 in a first direction 64 from upstream end 62a toward downstream end 62b. Preferably, inner wall surface diverging section 62f is frustoconical in shape as shown in the figures. Immediately downstream of inner wall surface diverging section 62f, inner wall surface 62 includes an inner wall surface central section 62g which extends toward downstream end 62b and which is preferably constant in diameter such that inner wall surface central section 62g is parallel to check valve assembly axis 56. Following inner wall surface central section 62g, inner wall surface 62 includes an inner wall surface converging section 62h which converges toward check valve assembly axis 56 when moving along check valve assembly axis 56 in first direction 64. As shown in the figures, inner wall surface converging section 62h may initiate as curvilinear which then transitions to frustoconical and then transitions again to curvilinear. Immediately downstream of inner wall surface converging section 62h, inner wall surface 62 includes an inner wall surface downstream section 62i which is preferably constant in diameter such that inner wall surface downstream section 62i is parallel to check valve assembly axis 56. Immediately following inner wall surface downstream section 62i, inner wall surface 62 includes an inner wall surface outlet section 62j which diverges away from check valve assembly axis 56 when moving along check valve assembly axis 56 in first direction 64. As shown in the figures, inner wall surface outlet section 62j may initiate as curvilinear which then transitions to frustoconical and then transitions again to curvilinear. In order to allow end cap 48 to be manufactured in a plastic injection molding process, inner wall surface converging section 62h, inner wall surface downstream section 62i, and inner wall surface outlet section 62j are features of an insert 66 which is received within a counterbore 50a of outlet conduit 50.

Insert 66 may be retained within counterbore 50*a*, by way of non-limiting example only, with one or more of interference fit, adhesives, mechanical fasteners, welding, and the like.

Figure 5:
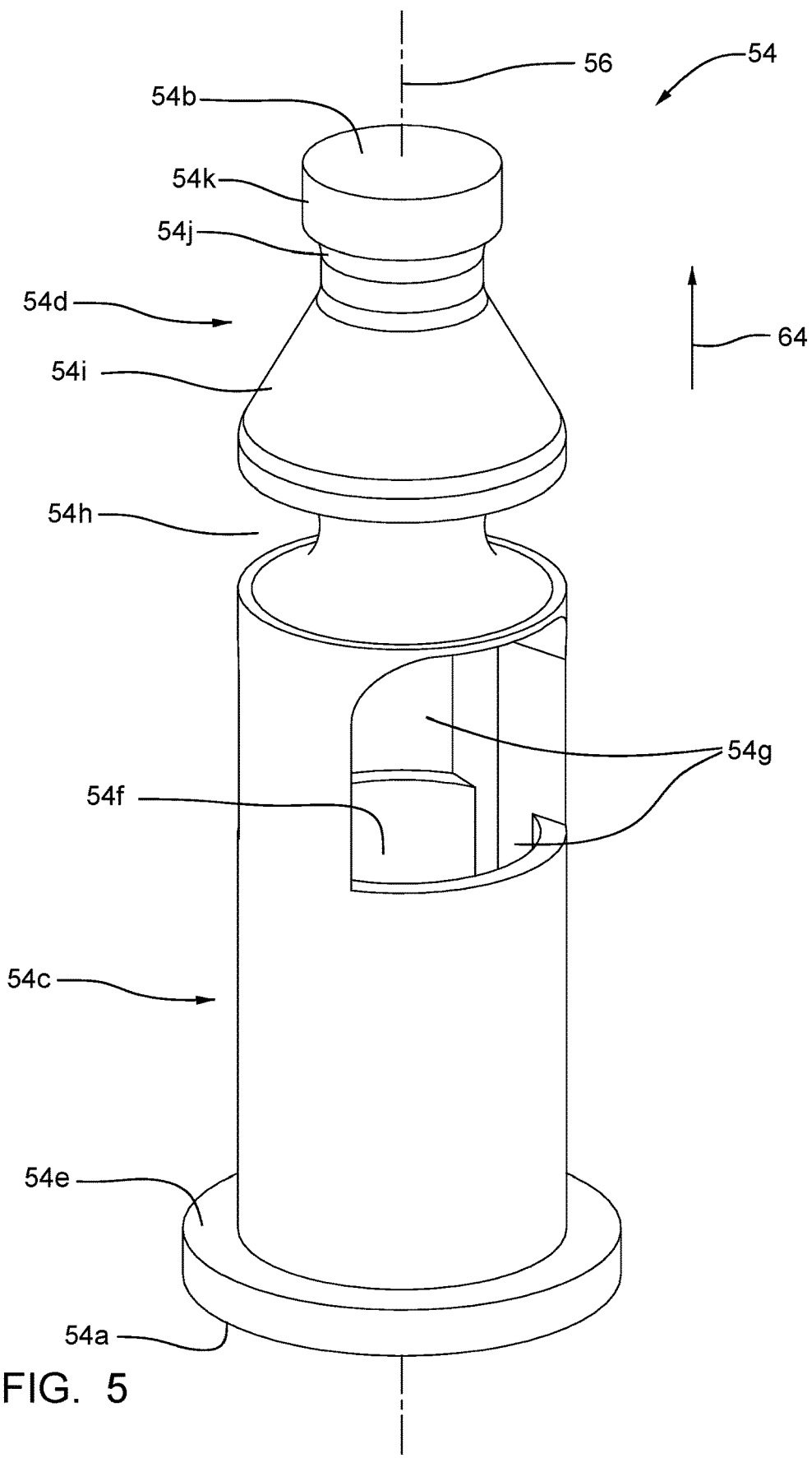
FIG. 5 is an enlarged isometric view of a valve stem of the check valve assembly.
Figure 6:
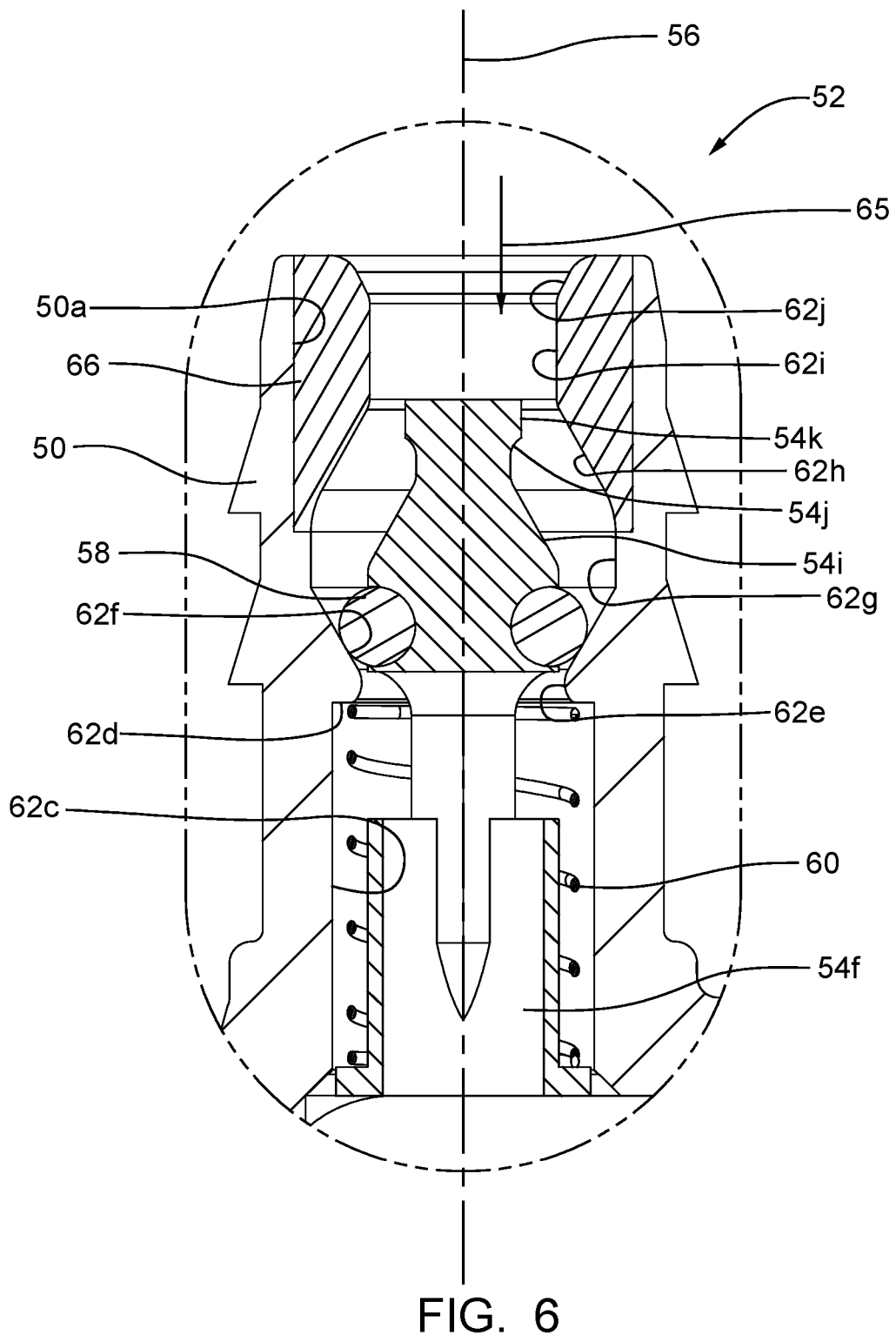
FIG. 6 is an enlarged cross-sectional view of the check valve assembly in a closed position.
Figure 7:
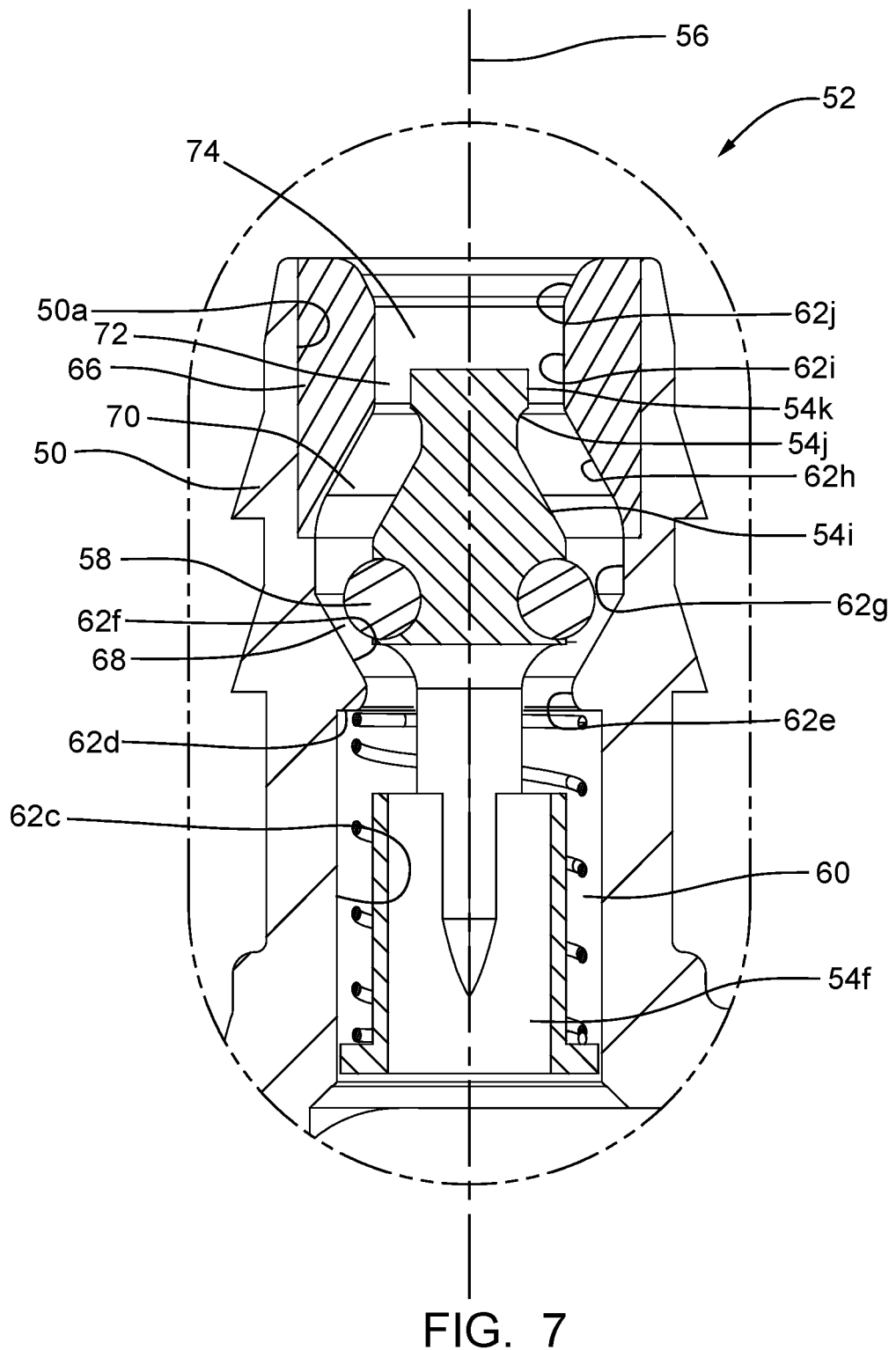
FIG. 7 is an enlarged cross-sectional view of the check valve assembly in an open position.

Now with particular reference to FIGS. 5-7, valve stem 54 includes a valve stem seating surface, illustrated herein by non-limiting example only as O-ring 58 which is carried and supported by valve stem 54 such that such that valve stem 54 and O-ring 58 move along check valve assembly axis 56 from a closed position where O-ring 58 seats against inner wall surface diverging section 62*f*, shown in FIG. 6, to an open position where O-ring 58 is spaced apart from inner wall surface diverging section 62*f*, shown in FIG. 7. When valve stem 54 is in the closed position, flow through outlet conduit 50 is prevented, and conversely, when valve stem 54 is in the open position, flow through outlet conduit 50 is permitted. Valve stem 54 is biased toward the closed position by valve spring 60 as will be described in greater detail later.

Valve stem 54 is centered about, and extends along, check valve assembly axis 56 from an upstream end 54*a* to a downstream end 54*b*. Valve stem 54 generally includes a valve stem lower section 54*c* and a valve stem head 54*d*. Valve stem lower section 54*c* initiates at upstream end 54*a* and terminates at valve stem head 54*d*. Valve stem lower section 54*c* includes a valve spring seat 54*e* at upstream end 54*a* which is annular in shape and with which one end of valve spring 60 is engaged. Valve stem lower section 54*c* is hollow, thereby including a valve stem central passage 54*f* extending axially thereinto from upstream end 54*a*. Valve stem central passage 54*f* provides a path for fuel to flow such that the fuel exits valve stem central passage 54*f* through valve stem windows 54*g* which extend outward from valve stem central passage 54*f* to the exterior surface of valve stem 54. In order to streamline flow out of valve stem central passage 54*f*, a radius is provided where valve stem central passage 54*f* meets valve stem head 54*d*.

Valve stem head 54*d* includes an annular groove 54*h* extending radially thereinto such that O-ring 58 is received within, and supported by, annular groove 54*h*. Downstream from annular groove 54*h*, valve stem head 54*d* includes a valve stem head converging section 54*i* which converges toward check valve assembly axis 56 when moving along check valve assembly axis 56 in first direction 64. As shown in the figures, valve stem head converging section 54*i* may initiate as curvilinear which then transitions to frustoconical and then transitions again to curvilinear. Downstream from valve stem head converging section 54*i* is a valve stem head diverging section 54*j* which diverges away from check valve assembly axis 56 when moving along check valve assembly axis 56 in first direction 64. As illustrated in the figures, valve stem head converging section 54*i* and valve stem head diverging section 54*j* may be separated by a brief section of uniform diameter which is parallel to check valve assembly axis 56. Also as illustrated in the figures, valve stem head diverging section 54*j* may be curvilinear. Immediately downstream of valve stem head diverging section 54*j* is a valve stem head termination section 54*k* which extends to downstream end 54*b* and which is constant in diameter such that valve stem head termination section 54*k* is parallel to check valve assembly axis 56.

In operation, valve spring 60 biases valve stem 54/O-ring 58 to the closed position such that flow in a second direction 65 which is opposition to first direction 64 is prevented. When fuel pump 10 is operated, fuel is pressurized to overcome the force of valve spring 60 which allows fuel to flow through check valve assembly 52 in first direction 64.

The previously described features of outlet conduit 50 and valve stem 54 work together in unison to minimize backpressure, in a flow path formed radially between outlet conduit 50 and valve stem 54. More specifically, when valve stem 54 is in the open position, a first restriction 68 is formed between valve stem 54 and inner wall surface diverging section 62*f*, and more specifically between O-ring 58 and inner wall surface diverging section 62*f*. First restriction 68 has a reduced cross-sectional area for the fuel to flow through, and as a result, the velocity of fuel increases at first restriction 68 while its pressure decreases. Downstream of first restriction 68 is a first expansion 70 which is formed at least by the space formed radially between O-ring 58 and inner wall surface central section 62*g* and radially between valve stem head converging section 54*i* and inner wall surface converging section 62*h*. First expansion 70 has an increased cross-sectional area for the fuel to flow through compared to first restriction 68, and as a result, the velocity of fuel decreases at first expansion 70 while its pressure increases. Downstream of first expansion 70 is a second restriction 72 which is formed at least by the space formed radially between valve stem head termination section 54*k* and inner wall surface downstream section 62*i*. Second restriction 72 has a reduced cross-sectional area for the fuel to flow through compared to first expansion 70, and as a result, the velocity of fuel increases at second restriction 72 while its pressure decreases. Downstream of second restriction 72 is a second expansion 74 which is formed by the portion of inner wall surface downstream section 62*i* which is downstream of valve stem 54 and is also formed by inner wall surface outlet section 62*j*. Second expansion 74 has an increased cross-sectional area for the fuel to flow through compared to second restriction 72, and as a result, the velocity of fuel decreases at second expansion 74 while its pressure increases.

Figure 8:
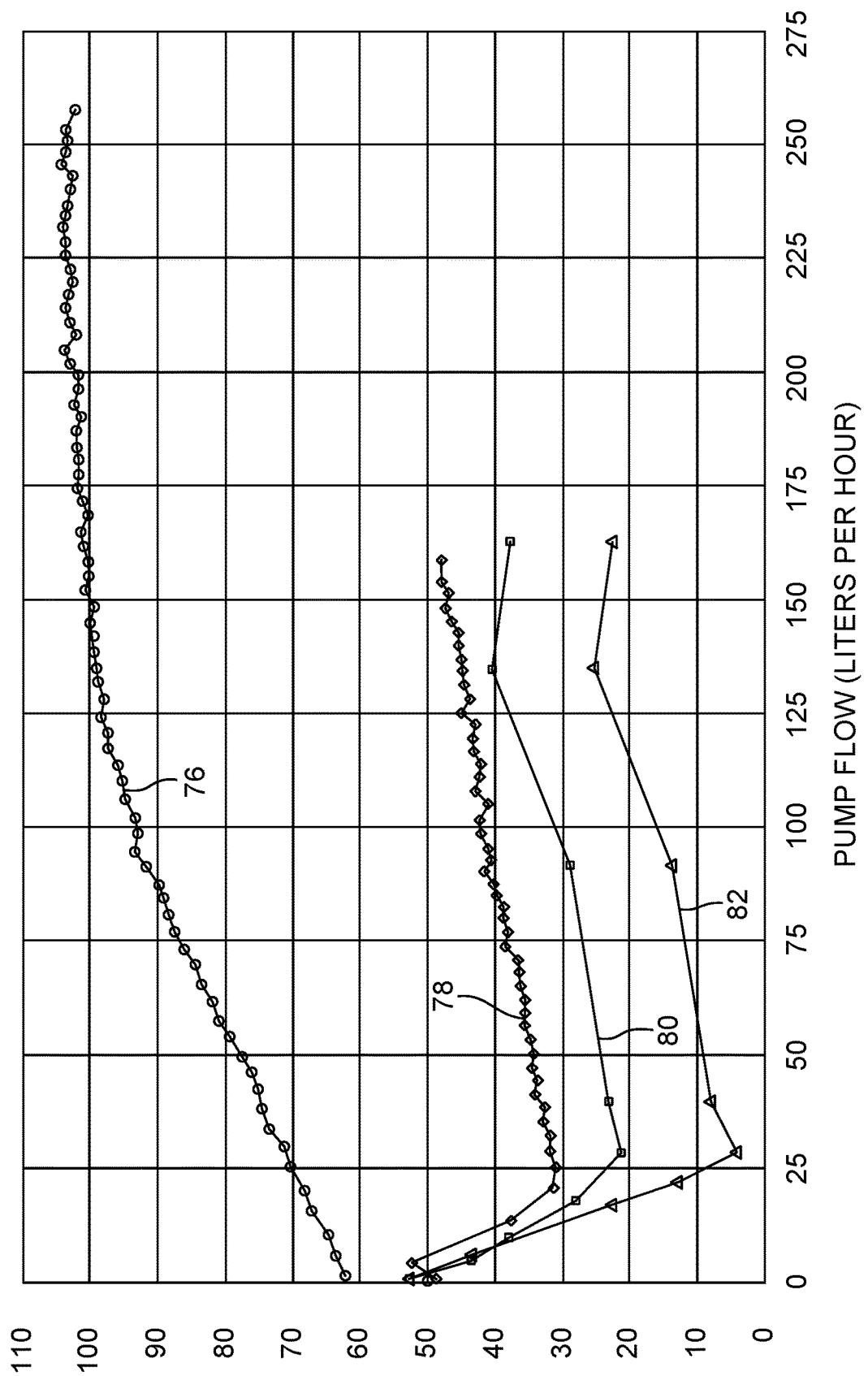
FIG. 8 is a graph showing pump flow vs. check valve assembly backpressure for a prior art check valve assembly and for check valve assemblies in accordance with the present disclosure.

Without being bound by theory, the Inventors have discovered that the sequence of first restriction 68, first expansion 70, second restriction 72, and second expansion 74 reduces the backpressure of check valve assembly 52 compared to prior art check valve assemblies. FIG. 8 is a graph illustrating the backpressure (shown on the ordinate axis) of check valve assemblies for varying pump flows (shown on the abscissa axis). Trace 76, with circular data points, shows the backpressure of a prior art check valve assembly using physical components. As can be seen, the backpressure increases as pump flow increases. Trace 78, with diamond-shaped data points, shows the backpressure of a check valve in accordance with the present disclosure using physical components. As can be seen, the backpressure initially drops drastically until the flow rate reaches about 25 liters per hour (LPH) and then gradually increases through 150 LPH where the backpressure returns to about its initial backpressure value when flow is initiated. At 150 LPH, the back pressure of trace 78 for a check valve assembly in accordance with the present disclosure is less than half of the back pressure of the prior art check valve assembly of trace 78. Traces 80 and 82, with square and triangular data points respectively, represent the backpressure of variations of the check valve assembly of the present disclosure where traces 80 and 82 were obtained through computational fluid dynamics (CFD) analysis. The variations provided were the angle of inner wall surface diverging section 62*f* and the length of valve stem head termination section 54*k*. As can be seen in FIG. 8, the variations which produced traces 80 and 82 resulted in even more favorable results than trace 78.

Check valve assembly 52 of fuel pump 10 as disclosed herein minimizes back pressure, thereby improving fuel delivery of fuel pump 10 while maintaining ease and low cost of manufacturing.

While this invention has been described in terms of preferred embodiments thereof, it is not intended to be so limited, but rather only to the extent set forth in the claims that follow.

We claim:

1. A fluid pump comprising:
a housing;
an inlet passage through which fluid enters said housing;
an outlet conduit through which fluid leaves said housing;
a pumping element within said housing, said pumping element being configured to draw fluid into said inlet passage and pressurize said fluid which is discharged through said outlet conduit; and
a check valve assembly, which allows flow through said outlet conduit in a first direction and prevents flow through said outlet conduit in a second direction which is opposite said first direction, said check valve assembly comprising:
said outlet conduit; and
a valve stem within said outlet conduit such that a flow path is created radially between said outlet conduit and said valve stem, said valve stem moving along a check valve assembly axis between a closed position which prevents fluid flow through said flow path and an open position which permits fluid flow through said flow path;
wherein said flow path includes a first restriction which increases velocity of fluid passing through said flow path; a first expansion, downstream of said first restriction, which decreases velocity of fluid passing through said flow path; a second restriction, downstream of said first expansion, which increases velocity of fluid passing through said flow path; and a second expansion, downstream of said second restriction, which decreases velocity of fluid passing through said flow path;
wherein said outlet conduit includes an inner wall surface;
wherein said valve stem includes a valve stem seating surface which 1) seats against said inner wall surface when said valve stem is in said closed position, thereby preventing fluid flow through said flow path and 2) is spaced apart from said inner wall surface when said valve stem is in said open position, thereby permitting fluid flow through said flow path;
wherein said first restriction is formed between said valve stem seating surface and said inner wall surface;
wherein said inner wall surface has an inner wall surface diverging section which diverges away from said check valve assembly axis when moving along said check valve assembly axis in said first direction;
wherein said valve stem seating surface seats against said inner wall surface diverging section when said valve stem is in said closed position;
wherein said inner wall surface has an inner wall surface converging section, downstream of said inner wall surface diverging section, which converges toward said check valve assembly axis in said first direction;
wherein said valve stem has a valve stem converging section which converges toward said check valve assembly axis in said first direction; and
wherein said first expansion is located radially between said inner wall surface converging section and said valve stem converging section.

2. A fluid pump as in claim 1, wherein:
said inner wall surface has an inner wall surface downstream section, downstream of said inner wall surface converging section, which is uniform in diameter;
said valve stem includes a valve stem termination section, downstream of said valve stem converging section, which is uniform in diameter; and
said second restriction is located radially between said inner wall surface downstream section and said valve stem termination section.

3. A fluid pump as in claim 2, wherein said inner wall surface converging section and said inner wall surface downstream section are provided on an insert which is received within a counterbore of said outlet conduit.

4. A fluid pump as in claim 2, wherein said second expansion is located within said inner wall surface downstream section, downstream of said valve stem.

5. A fluid pump as in claim 4, wherein:
said inner wall surface has an inner wall surface outlet section, downstream of said inner wall surface downstream section, which diverges away from said check valve assembly axis in said first direction; and
said second expansion is also located within said inner wall surface outlet section.

6. A fluid pump as in claim 1, wherein said valve stem includes an annular groove such that an O-ring is received within said annular groove, said O-ring providing said valve stem seating surface.

7. A check valve assembly which allows flow through a conduit in a first direction and prevents flow through said conduit in a second direction which is opposite said first direction, said check valve assembly comprising:
said conduit; and
a valve stem within said conduit such that a flow path is created radially between said conduit and said valve stem, said valve stem moving along a check valve assembly axis between a closed position which prevents fluid flow through said flow path and an open position which permits fluid flow through said flow path;
wherein said flow path includes a first restriction which increases velocity of fluid passing through said flow path; a first expansion, downstream of said first restriction, which decreases velocity of fluid passing through said flow path; a second restriction, downstream of said first expansion, which increases velocity of fluid passing through said flow path; and a second expansion, downstream of said second restriction, which decreases velocity of fluid passing through said flow path;
said conduit includes an inner wall surface;
said valve stem includes a valve stem seating surface which 1) seats against said inner wall surface when said valve stem is in said closed position, thereby preventing fluid flow through said flow path and 2) is spaced apart from said inner wall surface when said valve stem is in said open position, thereby permitting fluid flow through said flow path;
said first restriction is formed between said valve stem seating surface and said inner wall surface;
said inner wall surface has an inner wall surface diverging section which diverges away from said check valve assembly axis when moving along said check valve assembly axis in said first direction;

said valve stem seating surface seats against said inner wall surface diverging section when said valve stem is in said closed position;

said inner wall surface has an inner wall surface converging section, downstream of said inner wall surface diverging section, which converges toward said check valve assembly axis in said first direction;

said valve stem has a valve stem converging section which converges toward said check valve assembly axis in said first direction; and said first expansion is located radially between said inner wall surface converging section and said valve stem converging section.

8. A check valve assembly as in claim 7, wherein:

said inner wall surface has an inner wall surface downstream section, downstream of said inner wall surface converging section, which is uniform in diameter;

said valve stem includes a valve stem termination section, downstream of said valve stem converging section, which is uniform in diameter; and said second restriction is located radially between said inner wall surface downstream section and said valve stem termination section.

9. A check valve assembly as in claim 8, wherein said inner wall surface converging section and said inner wall surface downstream section are provided on an insert which is received within a counterbore of said conduit.

10. A check valve assembly as in claim 8, wherein said second expansion is located within said inner wall surface downstream section, downstream of said valve stem.

11. A check valve assembly as in claim 10, wherein:

said inner wall surface has an inner wall surface outlet section, downstream of said inner wall surface downstream section, which diverges away from said check valve assembly axis in said first direction; and said second expansion is also located within said inner wall surface outlet section.

12. A check valve assembly as in claim 7, wherein said valve stem includes an annular groove such that an O-ring is received within said annular groove, said O-ring providing said valve stem seating surface.

* * * * *